(12) United States Patent
Kim

(10) Patent No.: US 10,061,693 B2
(45) Date of Patent: Aug. 28, 2018

(54) METHOD OF GENERATING SECONDARY INDEX AND APPARATUS FOR STORING SECONDARY INDEX

(71) Applicant: Samsung Electronics Co., Ltd., Gyeonggi-do (KR)

(72) Inventor: Youn-woo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 486 days.

(21) Appl. No.: 14/694,442

(22) Filed: Apr. 23, 2015

(65) Prior Publication Data
US 2015/0310053 A1 Oct. 29, 2015

(30) Foreign Application Priority Data

Apr. 23, 2014 (KR) ........................ 10-2014-0048924

(51) Int. Cl.
*G06F 12/02* (2006.01)
(52) U.S. Cl.
CPC .. *G06F 12/0246* (2013.01); *G06F 2212/1016* (2013.01); *G06F 2212/1044* (2013.01); *G06F 2212/214* (2013.01); *G06F 2212/7201* (2013.01)
(58) Field of Classification Search
CPC .............. G06F 17/30312; G06F 12/00; G06F 17/30159; G06F 17/30327; G06F 17/30339; G06F 12/0246; G06F 2212/1021; G06F 2212/1016; G06F 2212/1044; G06F 2212/214; G06F 2212/7201; G06F 3/0626; G06F 3/064; G06F 3/0644; G06F 3/0679; G06F 3/0685

USPC ......................... 707/741, 609, 696
See application file for complete search history.

(56) References Cited

U.S. PATENT DOCUMENTS

| | | | | |
|---|---|---|---|---|
| 6,061,678 A | * | 5/2000 | Klein | G06F 17/30321 |
| 9,612,955 B2 | * | 4/2017 | Akella | G06F 12/0246 |
| 2009/0031076 A1 | * | 1/2009 | In | G06F 3/0616 711/103 |
| 2013/0097380 A1 | * | 4/2013 | Colgrove | G06F 17/30159 711/118 |
| 2013/0290343 A1 | * | 10/2013 | Kruglick | G06F 17/30321 707/741 |
| 2013/0290648 A1 | * | 10/2013 | Shao | G06F 12/04 711/154 |
| 2013/0346415 A1 | * | 12/2013 | Tomlinson | G06F 17/30958 707/741 |

(Continued)

*Primary Examiner* — Dennis Truong
(74) *Attorney, Agent, or Firm* — The Farrell Law Firm, P.C.

(57) ABSTRACT

A method and apparatus for generating and storing a secondary index. The method includes generating, in response to a size of an index data being greater than a size of a memory block, an index data table including the index data and recording the index data table in a memory, generating a metadata table of the index data table and recording the metadata table in the memory, and performing a merge and sort regarding at least one of the index data table and the metadata table. The apparatus includes a memory; and a controller configured to, in response to a size of index data being greater than a size of a memory block, generate an index data table including the index data and record the index data table in a memory, and perform a merge and sort regarding at least one of the index data table and the metadata table.

16 Claims, 15 Drawing Sheets

(56) References Cited

U.S. PATENT DOCUMENTS

| | | | |
|---|---|---|---|
| 2013/0346720 A1* | 12/2013 | Colgrove | G06F 3/0608 711/165 |
| 2014/0279855 A1* | 9/2014 | Tan | G06F 17/30345 707/609 |
| 2015/0142817 A1* | 5/2015 | Zheng | G06F 17/30327 707/741 |
| 2015/0213068 A1* | 7/2015 | Tamura | G06F 17/30312 707/741 |

* cited by examiner

METHOD OF GENERATING SECONDARY INDEX AND APPARATUS FOR STORING SECONDARY INDEX

PRIORITY

This application claims priority under 35 U.S.C. § 119(a) to a Korean Patent Application filed on Apr. 23, 2014 in the Korean Intellectual Property Office and assigned Serial No. 10-2014-0048924, the entire contents of which are incorporated herein by reference.

BACKGROUND

1. Field of the Invention

The present invention relates generally to an apparatus for storing, and more particularly, to a secondary index structure of a Solid State Drive (SSD) for efficient storage of data.

2. Description of the Related Art

A Solid State Drive (SSD) is a storage medium which stores data. Though usage, appearance, and an installation method of the SSD are similar to those of a hard disk, the SSD has a built-in memory, and thus, enables more rapid reading or writing of data than a hard disk. In addition, there is no part in an SSD which physically rotates or moves as in a hard disk, no noise is generated and power consumption is less that for a hard disk. Thus, if the SSD is used for a portable computer, battery life increases. SSD products are divided into those that include a Random-Access Memory (RAM) as a storage medium and those that include a flash memory as a storage medium.

Recently, upon demand for big data and data analysis, a scale out key-value storage system which functions as a secondary index is desired. In addition, SSD is needed to increase performance and lower power consumption. A secondary index has an Input/Output (I/O) pattern which does not consider the features of the SSD, and therefore, the writing function is slower than for an SSD, and overhead is incurred due to garbage collection.

FIG. 1A illustrates a B-tree structure and FIG. 1B illustrates a secondary index using the B-tree structure.

Referring to FIGS. 1A and 1B, a secondary index using the B-tree sorts and maintains data according to keys, updates the sorted data when additional data is inserted and deleted, and records the updated data. In this scheme, when additional data is inserted or deleted, contents of the subject data area are corrected and then re-written. In FIG. 1B, when 2 and 5 are inserted into the table (1,4,7), the finally-sorted data table (1,2,4,5,7) is re-written.

However, the related art has a drawback in that re-writing of data occurs in a random writing format. The random writing makes it hard for the SSD to achieve maximum performance, and increases the garbage collection load.

FIG. 2A illustrates a Log-Structured Merge (LSM) tree which performs merge, sort, or compaction, and FIG. 2B illustrates a secondary index using the LSM tree.

A secondary index using the LSM tree sorts and maintains data according to keys, but when additional data is inserted and deleted, the secondary index independently records data as newly-sorted data. As illustrated in FIG. 2B, when additional data is inserted or deleted, data for an additional operation is separately sorted and stored.

In this technology, I/O traffic occurs with sequential writing, and thus, maximum performance may be achieved. However, as independently-sorted data increases, data which is respectively separated must be accessed for data search, and consequently, performance is reduced. When reading data, a Bloom filter is used to reduce I/O traffic, but there is a limit to the reduction, and if merge is performed, overhead is incurred accordingly.

Therefore, there is a need for a secondary index structure to reduce I/O traffic cost, reduce merge overhead, and improve space efficiency.

SUMMARY

The present invention has been made to address the above-mentioned problems and disadvantages, and to provide at least the advantages described below. Accordingly, an aspect of the present invention provides a secondary index structure which reduces I/O traffic cost, reduces merge overhead, and improves space efficiency and a method for generating the secondary index.

In accordance with an aspect of the present invention, a method of generating a secondary index is provided. The method includes generating, in response to a size of an index data being greater than a size of a memory block, an index data table including the index data and recording the index data table in a memory, generating a metadata table of the index data table and recording the metadata table in the memory, and performing a merge and sort regarding at least one of the index data table and the metadata table.

In accordance with another aspect of the present invention, an apparatus for storing a secondary index is provided. The apparatus includes a memory, and a controller configured to, in response to a size of an index data being greater than a size of a memory block, generate an index data table including the index data and record the index data table in a memory, and perform a merge and sort regarding at least one of the index data table and the metadata table.

BRIEF DESCRIPTION OF THE DRAWINGS

The above and/or other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1A:
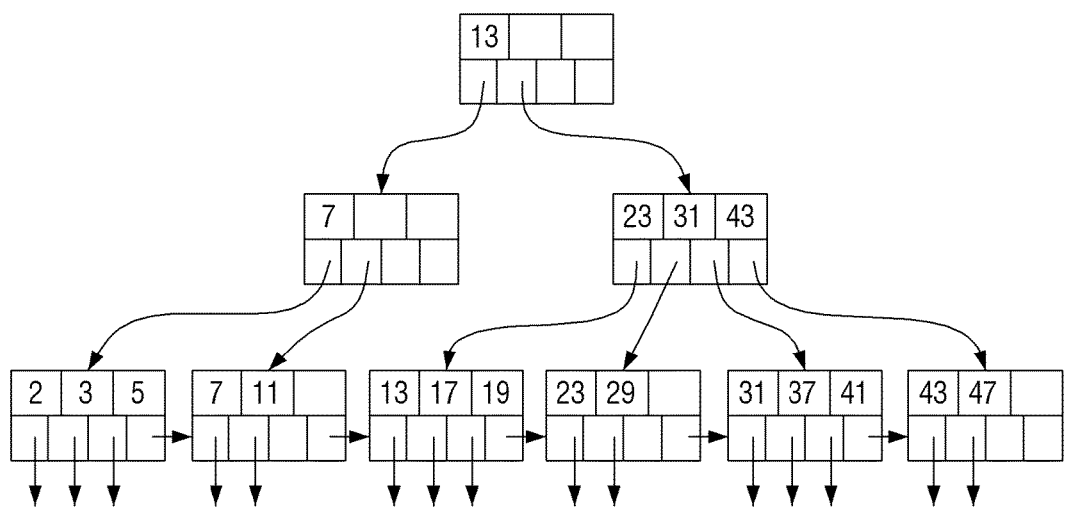
FIG. 1A is an illustration of a B-tree.
Figure 1B:
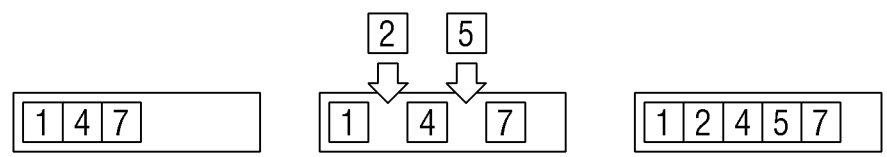
FIG. 1B is an illustration of a secondary index using a B-tree.
Figure 2A:
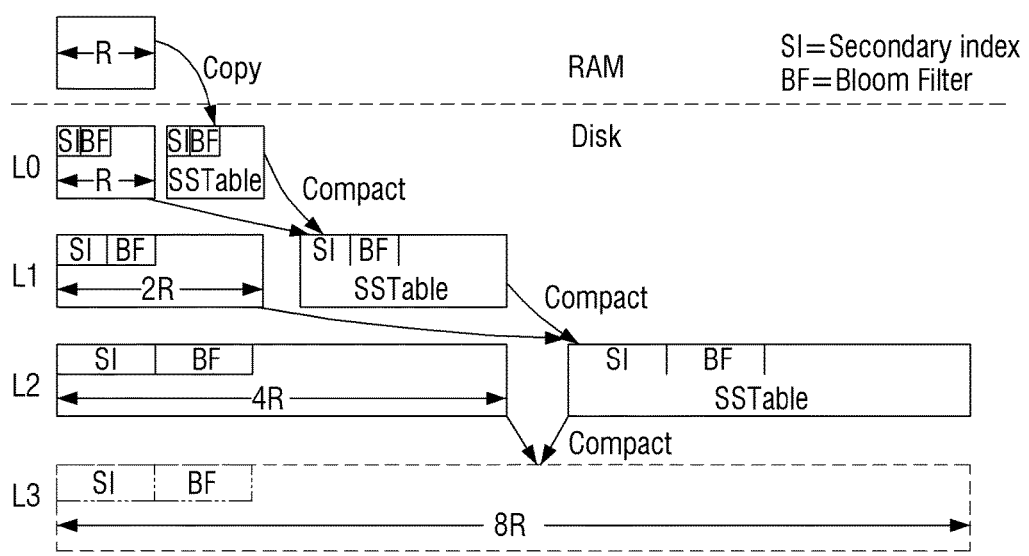
FIG. 2A is an illustration of an LSM tree which performs merge, sort, or compaction.
Figure 2B:
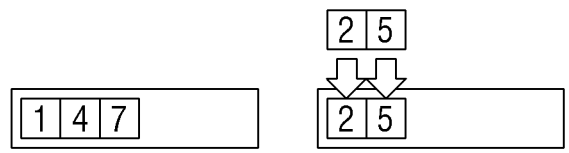
FIG. 2B is an illustration of a secondary index using an LSM tree.

Embodiments of the present invention are described below with reference to the accompanying drawings.

In the following description, like drawing reference numerals are used for like elements, even in different drawings. The matters defined in the description, such as detailed construction and elements, are provided to assist in a comprehensive understanding of the embodiments of the present invention. However, the embodiments of the present invention can be practiced without those defined matters. Also, well-known functions or constructions are not described in detail since they would obscure the application with unnecessary detail.

Figure 3:
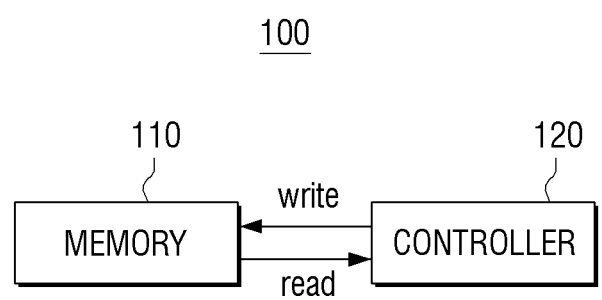
FIG. 3 is a block diagram of a secondary index storing apparatus according to an embodiment of the present invention.

FIG. 3 is block diagram of a secondary index storing apparatus 100 according to an embodiment of the present invention.

Referring to FIG. 3, the secondary index storing apparatus 100 includes a memory 110 and a controller 120, where the controller 120 controls reading and writing of the memory 110.

The memory 110 includes at least one of a Random Access Memory (RAM) and a flash memory. There is no limitation in the type of flash memory that may be used, and the flash memory may be nondisjunction (NOR) type or non-conjunction (NAND) type. The memory 110 stores primary data and may store various data such as raw data and the secondary index. The flash memory may store a metadata table and an index data table which are described below, but the metadata table may be stored in a RAM.

The controller 120 controls reading and writing of the memory 110.

In an embodiment of the present invention, the controller 120, when the size of the index data is greater than the size of a memory block, generates an index data table which includes the index data and a metadata table regarding the index data table, and records the tables in the memory 110.

In this case, the index data indicates a data area of the Sorted String Table (SSTable). The SSTable, which was proposed by Google™, stores data as a "bigtable" structure. The physical file storage structure has a format which is preliminarily sorted based on the first sorting condition. Therefore, the index data table, which contains the index data, may have a format of an SSTable, where the SSTable contains the index data.

Metadata indicates metadata regarding the index data. The metadata table, which contains metadata, may have a format of an SSTable, where the SSTable contains the metadata. The structure of the metadata table is described below.

In addition, the controller 120 performs merge, sort, or compaction for at least one of the index data table and the metadata table. The details of merge and sort are described below.

Figure 4:
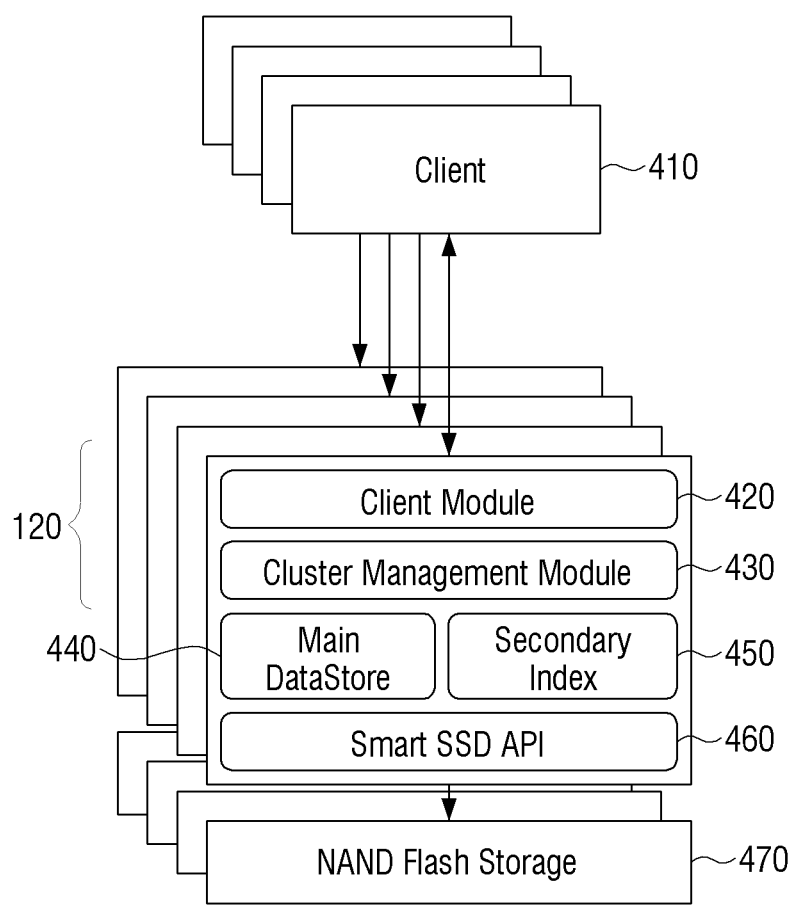
FIG. 4 is a block diagram of a memory controller using a secondary index according to an embodiment of the present invention.

FIG. 4 is a block diagram of the controller 120 using a secondary index according to an embodiment of the present invention.

Referring to FIG. 4, the controller 120 includes a client module 420 which processes a request of a client 410, a cluster management module 430 for processing big data, a main data store 440 for storing main data, a secondary index 450, and a smart SSD Application Programming Interface (API) 460 which reads or writes data on a flash memory 470.

Figure 5:
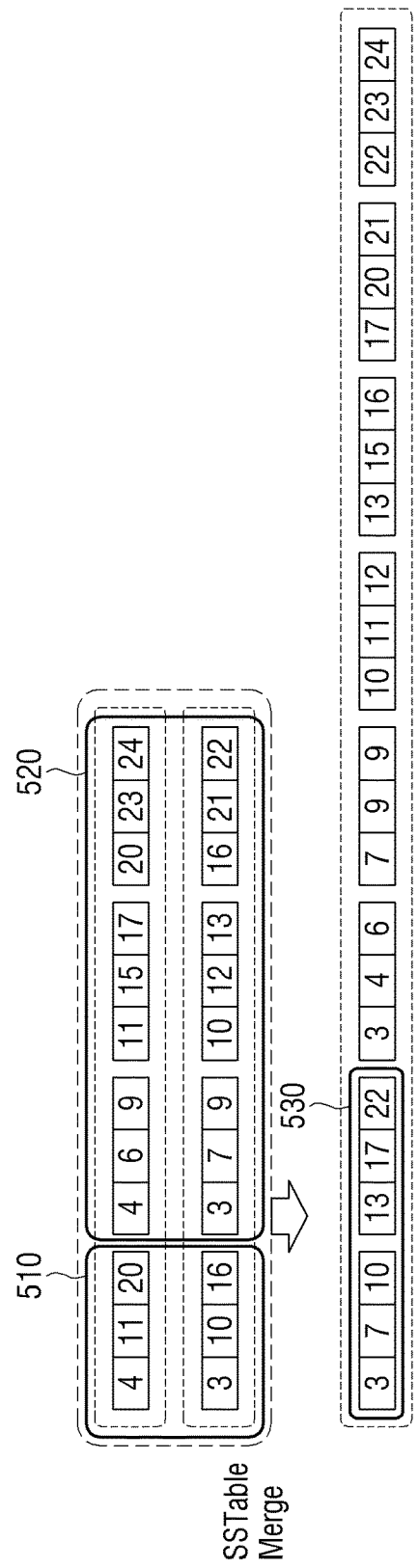
FIG. 5 is an illustration of a merge and sort of an index data table and a metadata table.

FIG. 5 is an illustration of a merge and sort of an index data table and a metadata table.

Referring to FIG. 5, the merge and sort method performs merge and sort of the index data table 520 and the metadata table 510, that is, the entire SSTable. To be specific, the index data table 520 is made into a new index table by performing merge and sort, and a metadata table 530 regarding the newly-generated index table is generated. In addition, the metadata table 510 is discarded. The newly generated index data table is generated without the occurrence of a false positive, thereby improving performance. However, it takes time to merge and sort the newly generated index table, and thus, overall, the reading overhead increases.

The process to determine whether to perform merge and sort at an initial stage is necessary. When the number of index data tables increases, sorting of index data tables does not occur among the different index data tables, and consequently, the number of false positives increases. Accordingly, merge and sort is necessary at the right time. There are various algorithms for determining this.

According to an embodiment of the present invention, the controller 120, when the index data table for which merge and sort is not performed is greater than a preset number, performs merge and sort for at least one of the index data tables for which merge and sort was not performed and the metadata table regarding the index data table for which the merge and sort was not performed.

Figure 6:
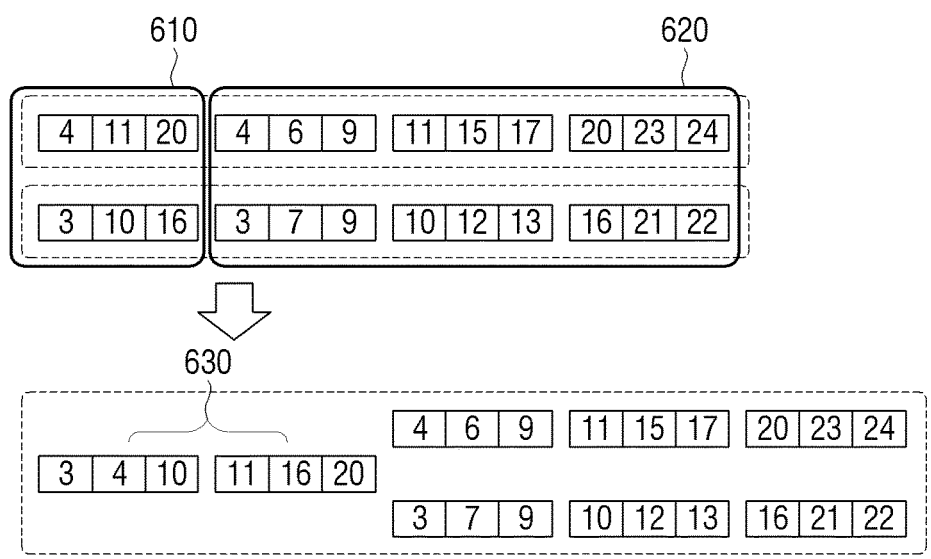
FIGS. 6 and 7 are illustrations of a merge and sort of an index data table and a metadata table according to an embodiment of the present invention.
Figure 7:
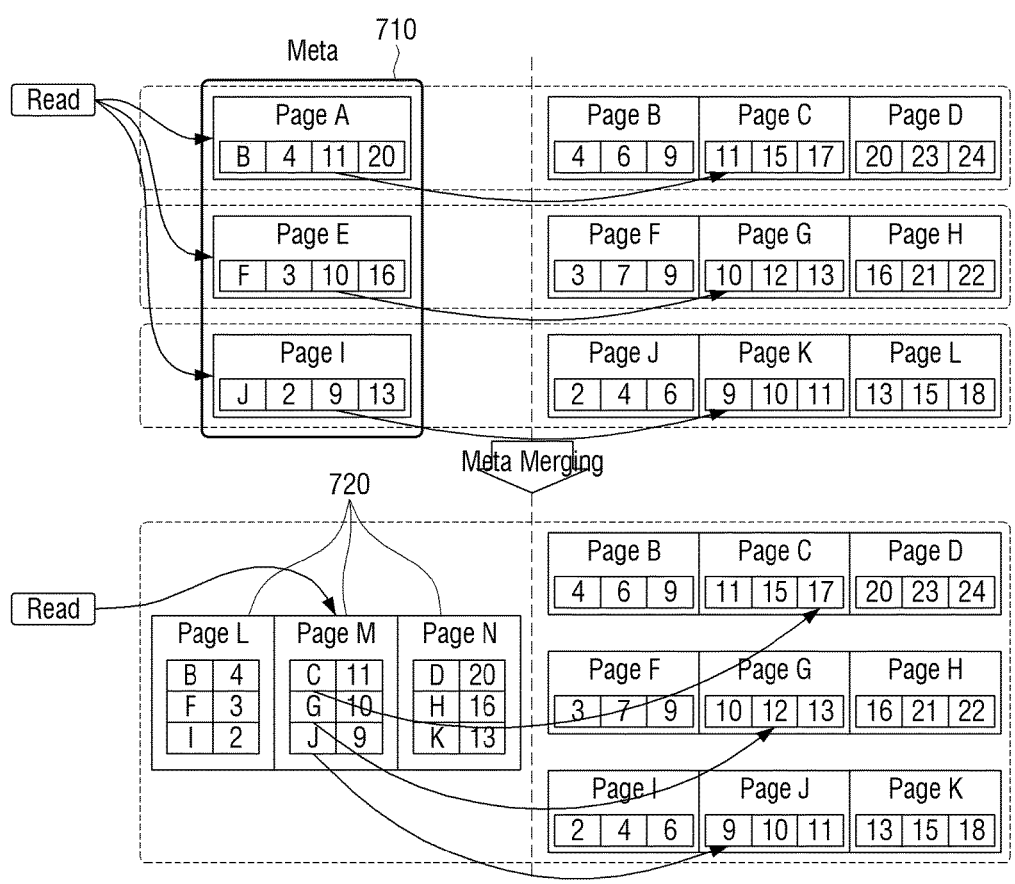

FIGS. 6 and 7 are illustrations of merge and sort of an index data table and a metadata table according to an embodiment of the present invention.

A reading, or get, operation regarding one SSTable finds a subject index data by reading the metadata table and finally reads the subject index data by reading the index data table. Accordingly, the number of I/O reads necessary to accomplish this is equal to (the size of the SSTable*2).

Referring to FIG. 6, the controller 120 performs merge and sort for the metadata tables only regarding the index data table for which merge and sort is not performed. In this case, the number of I/O reads regarding the metadata table is reduced, and the I/O cost may be reduced compared to merge and sort on the entire SSTable.

In an embodiment of the present invention illustrated in FIG. 6, merge and sort is performed for the metadata table (4,11,20) and (3,10,16) 610, and the metadata table (3,4,10, 11,16,20) 630 is obtained. In this case, the merge and sort is not performed for the index table 620. As described, when the metadata table 630 is rearranged by similar areas, the number of I/O reads may be reduced.

FIG. 7 illustrates an embodiment of the present invention. In the embodiment of the present invention illustrated in FIG. 7, merge and sort of the metadata table (B,4,11,20), metadata table (F,3,10,16), and metadata table 0,2,9,13) 710 is performed. Before performing merge and sort, reading of the meta table 710 is performed one time, when a reading failure (e.g. a false positive) occurs, in a worst case, the metadata table 710 is read once by each SSTable, and an index data table must be read.

When merge and sort is performed, one new metadata table is generated. In an example of FIG. 7, metadata table (B,4/F,3/I,2) of page L, metadata table (C,11/G,10/J,9) of page M, metadata table (D,20/H,16/K,13) of page N 720 are generated. Metadata tables of each page are sorted, after performing merge and sort, a metadata table on one page must only be read once, and thus, I/O reads are reduced substantially.

Figure 8:
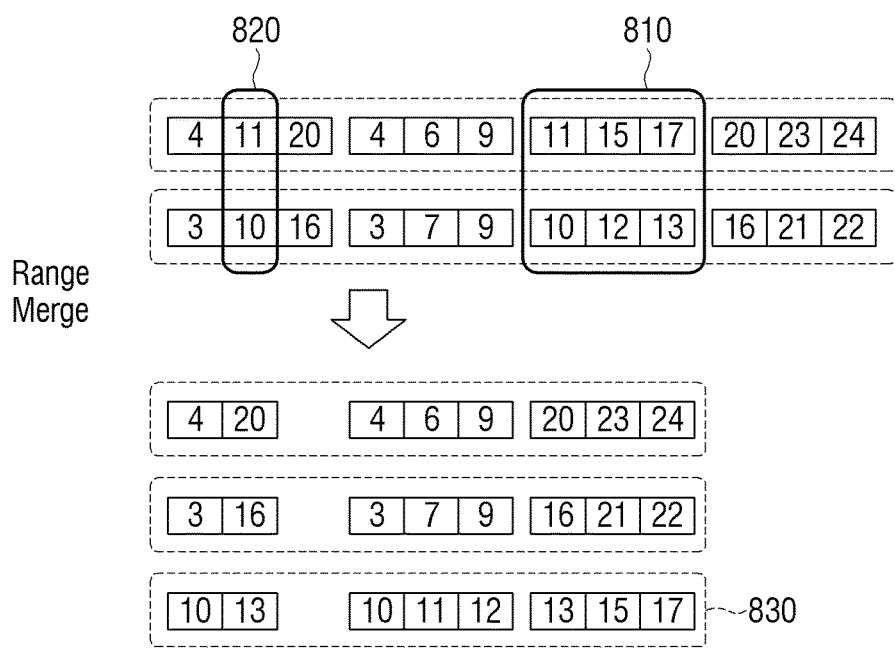
FIGS. 8 and 9 are illustrations of a merge and sort of an index data table and a metadata table according to an embodiment of the present invention.
Figure 9:
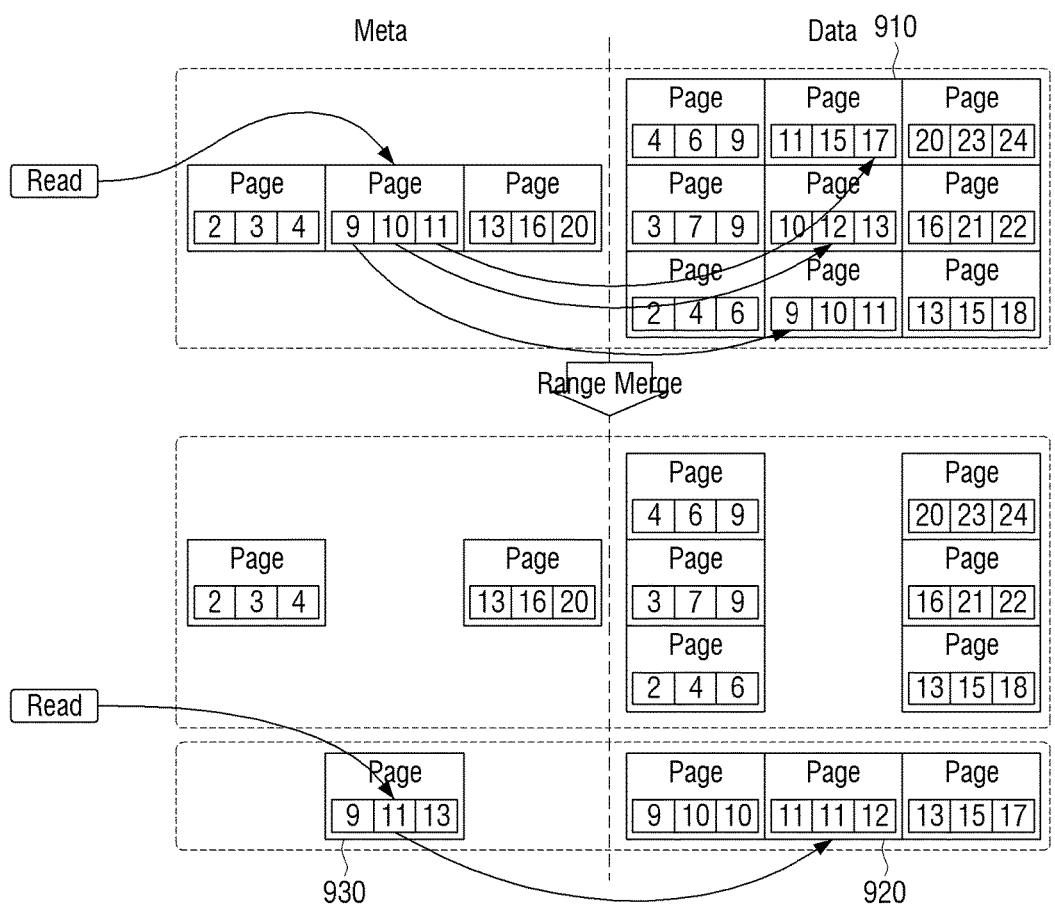

FIGS. 8 and 9 are illustrations of a merge and sort of an index data table and a metadata table according to an embodiment of the present invention.

The reason why the number of I/O reads increases is that false positives increase due to an unarranged index data table and metadata table. That is, an area where false positives frequently occur is where a sort of the secondary index is not performed. Therefore, a sort of this area only is performed. In this case, an entire SSTable is not sorted, and thus, the entire I/O read overhead is reduced substantially.

In an embodiment of the present invention illustrated in FIG. 8, the controller 120 performs a range merge and sort or a range compaction for an index data table for which a false positive occurs for not less than a number of preset times.

In FIG. 8, it is assumed that false positives occur frequently at an area of the table (11,15,17) and an area of the table (10, 12, 13) 810. In this case, merge and sort is performed for these areas only.

In addition, the controller 120 generates the metadata table for the index data table on which the range merge and sort is performed, and records the index data table in the memory 110. In other words, the metadata table (10, 13) 830 is generated with respect to the newly-sorted table (10,11, 12), (13,15,17) 830.

In an embodiment of the present invention illustrated in FIG. 9, when a range merge and sort is performed for the index data tables (11,15,17), (10,12,13), (9,10,11) 910, new index data tables (9,10,10), (11,11,12), (13,15,17) 920 are generated. The metadata table (9,11,13) 930 regarding these index data tables 920 is generated.

In the present invention, the merge and sort deletes overlapping data. Accordingly, an index data table such as (9,10,10) is generated.

Figure 10:
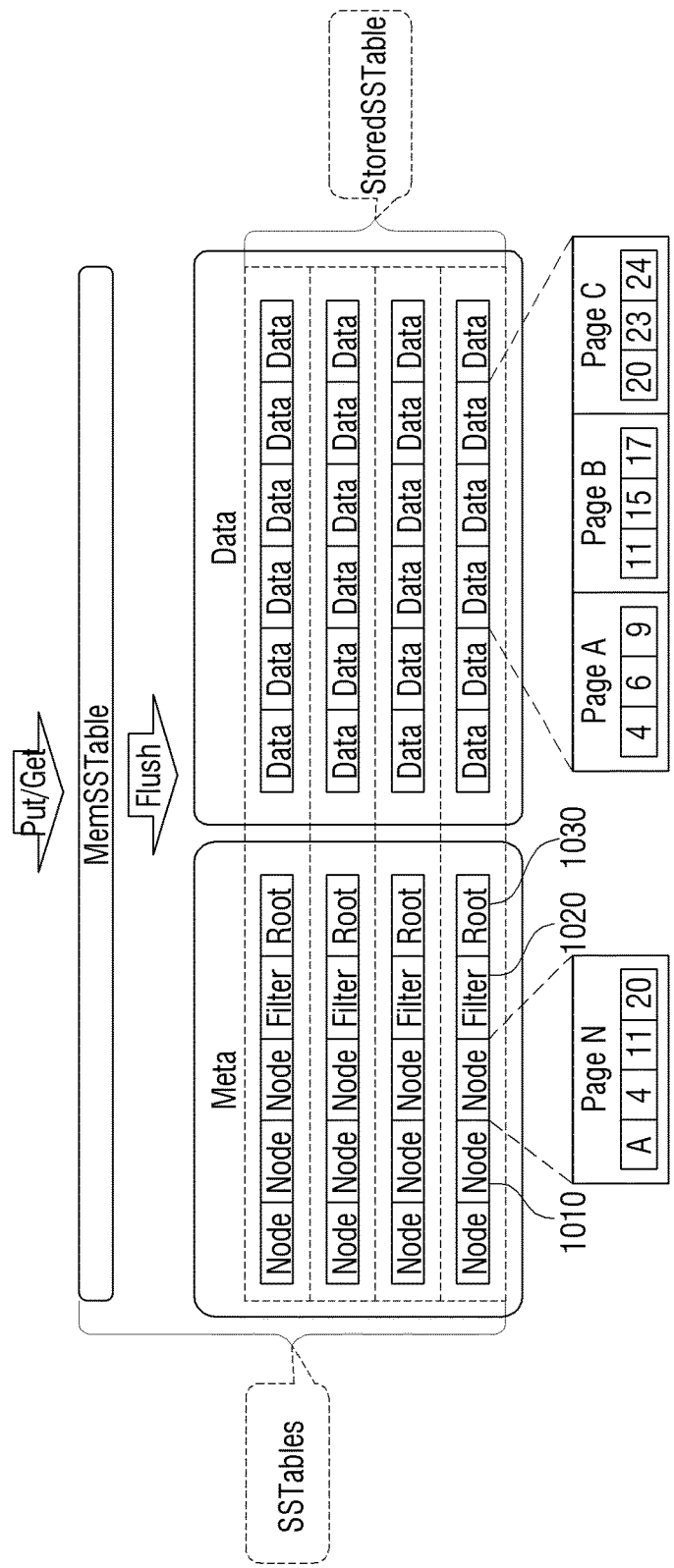
FIG. 10 is an illustration of a secondary index.

FIG. 10 is an illustration of a secondary index.

Referring to FIG. 10, one secondary index is composed of one MemSSTable and N StoredSSTable. When there is a request for a reading (e.g. a Get), reading is performed for all the SSTables from the MemSSTable to the StoredSSTable. When there is a request for a writing (e.g. a Put), sorting is performed for the MemSSTable first and then, when the size of MemSSTable becomes a specific size, the result of the sorting is stored in an SSD in a format of a StoredSSTable. As to the StoredSSTable, when the MemSSTable is stored in an SSD, several pages are stored at a time as sequential writing (e.g. flush).

Referring to FIG. 10, the metadata table includes a node 1010, a filter 1020, and a root 1030. This will be explained in greater detail with reference to FIG. 11.

Figure 11:
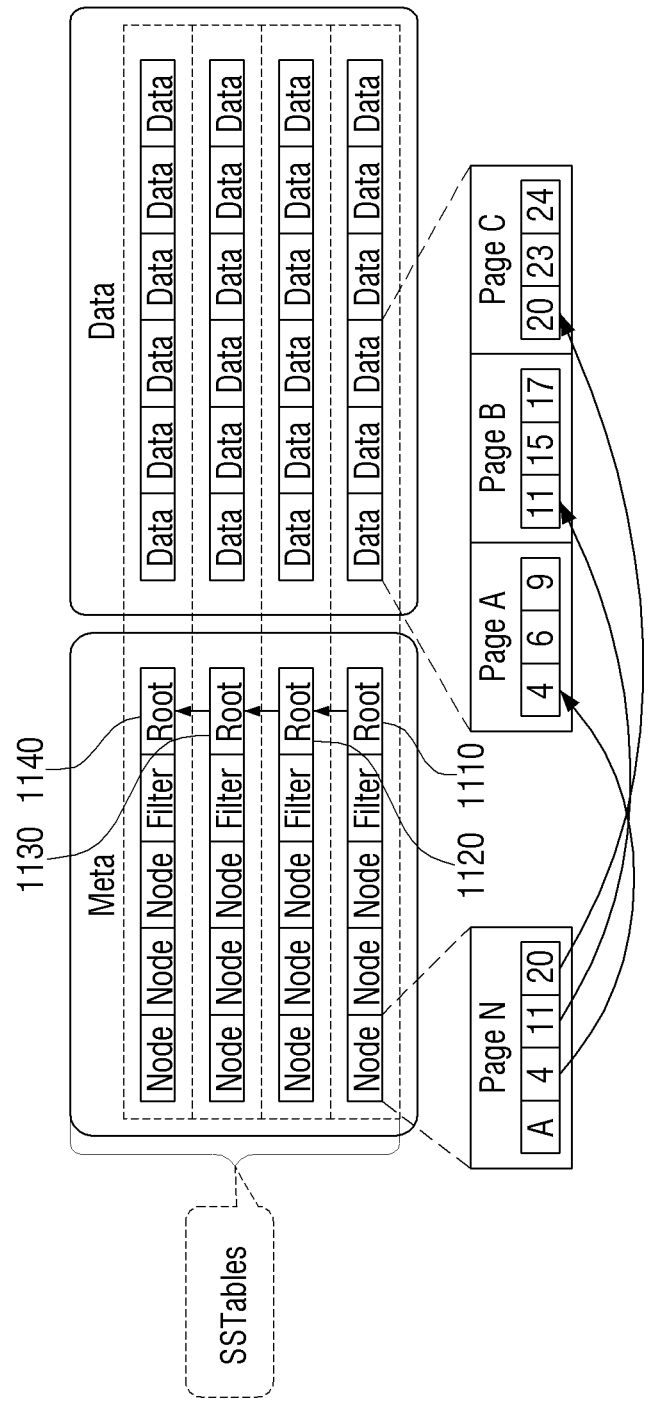
FIG. 11 is an illustration of a metadata table.

FIG. 11 is an illustration of a metadata table.

The field of the metadata table includes a node, a root, and a filter. A node takes most of the data, and a root and a filter are present in each SSTable. The size of the root and filter is smaller than the size of the entire SSTable, and therefore, the root and the filter may be present in the memory all of the time.

The filter includes information of a Bloom filter which is used to determine whether the corresponding key is present in the SSTable.

The root includes information on the scope of a page constituting the SSTable as a representative of the SSTable. The root is recorded at the physically last page within the SSTable. In addition, the latest root includes an address value of the previous root page. By following the address of the previous root of this root, all of the SSTable may be restored.

The node has the first key values of the data pages. Accordingly, when inquiring of the node, an area of the key, which the data page in the area managed by the node includes, is obtained. The data page is disposed on the succeeding address space. Therefore, in the node, it is known that a Process Identification (PID) of the following page is successive, and thus, if the PID of the first data page is recorded, and then a key of each data page is disposed, search is available.

Figure 12:
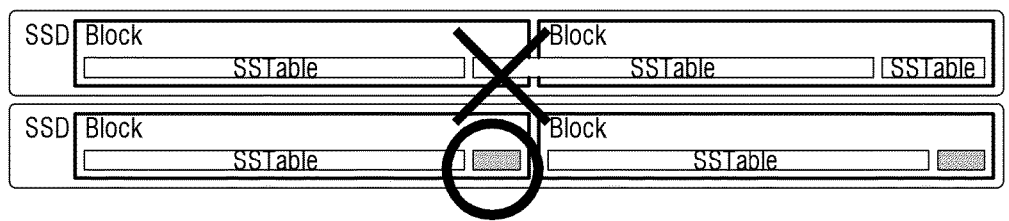
FIG. 12 is an illustration of a memory block in which an SSTable is recorded.

FIG. 12 is an illustration of a memory block in which an SSTable is recorded.

According to various embodiments of the present invention, the index data table for which a merge and sort is performed is recorded in at least one memory block. In other words, only one index block is recorded in a memory block.

Referring to FIG. 12, one SSTable is recorded over two blocks. In this case, when the SSTable is deleted as it is not necessary anymore, or is merged and sorted with another SSTable in one block, and the merged and sorted SSTable is deleted, another SSTable is still present. In this case, the corresponding block may not be returned due to another SSTable, and therefore, overhead is incurred in the garbage collection process.

In the present invention, the index data table and the metadata table (i.e., the SSTable) are recorded in consideration of the size of a memory block, and thus, after deleting an SSTable, the corresponding block may be recycled without garbage collection, and thus, efficiency is increased.

Further, in the present invention, by using the atomic writing function of the smart SSD, safe writing is available even without journaling, and therefore, overhead resulting from journaling is eliminated.

As described above, the present invention provides a function to re-store an SSTable by using the root page. Each of the SSTables is composed of a metadata table and an index data table, and the root page is recorded last. In addition, regarding the root page, position information of the previous root page is recorded. Therefore, after reading the root page 1110, which is read last, when finding and reading previous root pages (1120,1130,1140), all of the root pages of the entire SSTable may be read within a short time. In the root page, the page information on the SSTable is present, and thus, the SSTable may be reconstructed using only the root page. Using the function of the SmartSSD, by obtaining the position where writing takes place last and searching for the last root page, the SSTable may be added without changing the metadata.

Meanwhile, the root page is recorded in its entirety through atomic writing, and thus, depending on the record of the root page which is recorded last, whether to write to the SSTable may be determined. Therefore, a checksum bit or a parity bit is not necessary.

Hereinbelow, a method for generating the secondary index according to an embodiment of the present invention is described.

Figure 13:
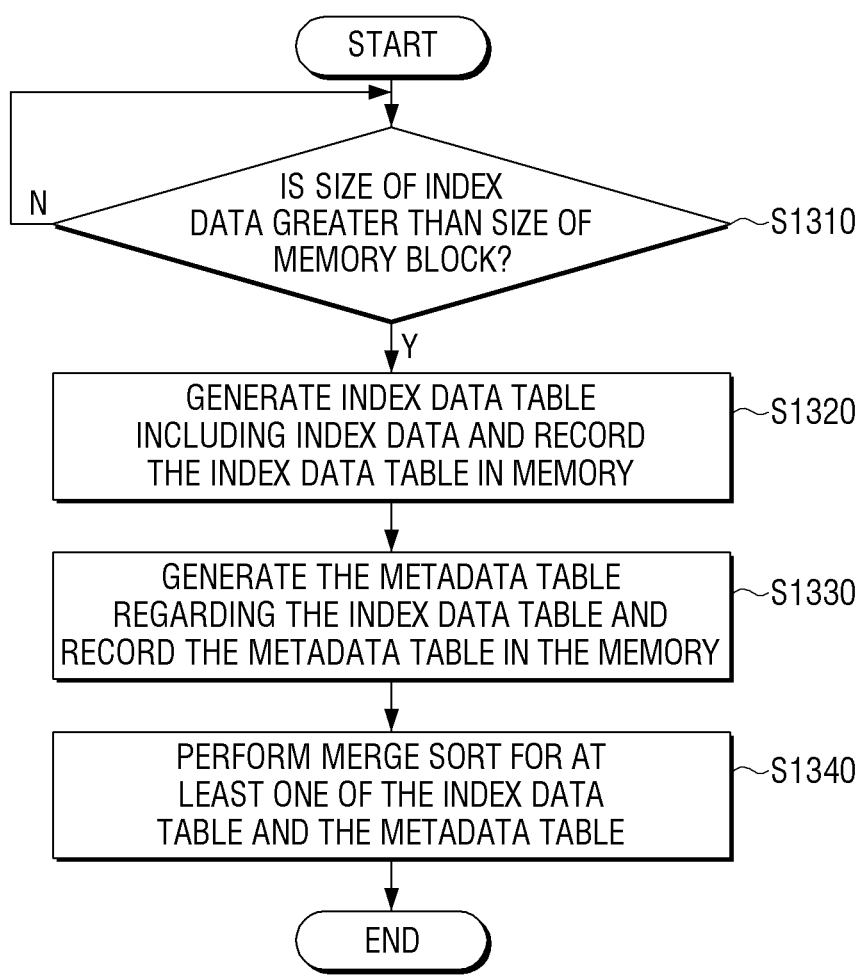
FIG. 13 is a flowchart of a method of generating a secondary index according to an embodiment of the present invention.

FIG. 13 is a flowchart of a method of generating a secondary index according to an embodiment of the present invention.

Referring to FIG. 13, a method of generating a secondary index according to an embodiment of the present invention includes, when, in step 1310 it is determined that a size of an index data is not less than the size of a memory block, generating, in step 1320, an index data table including the index data and recording the index data table in a memory block, generating, in step 1330, a metadata table regarding the index data table and recording the metadata table in the memory, and performing, in step 1340, merge and sort for at least one of the index data tables and the corresponding metadata tables.

In this case, merge and sort, when the index data table for which merge and sort is not performed is not less than a preset number, is performed for at least one of the index data tables for which merge and sort is not performed and the corresponding metadata tables.

The merge and sort may be performed for the metadata tables regarding the index data tables for which the merge sort is not performed.

Further, merge and sort may include range compaction of the index data table in which a false positive occurs for not less than a number of preset times.

In addition, the metadata table regarding the index data table for which the range compaction is performed may be recorded.

Further, the metadata table may include at least one of the page information of the index data, first key value of the index data table, a Bloom filter value, and the root value indicating the range of the page of the index data.

In addition, the index data table for which merge and sort is performed may be recorded in at least one memory block.

Only one index data table is recorded in a memory block.

The merge and sort may be performed for at least one of the index data table for which the merge sort is not performed and corresponding metadata table.

The root value may be recorded through atomic writing.

A method of generating a secondary index according to an embodiment of the present invention may be embodied in pseudo code of an algorithm described below.

First of all, the merge and sort of a metadata table may be realized as the algorithm described below.

In the algorithm, the SSTableManager module, the StoredSSTable module, and PageManager module are defined as follows.

```
SStableManager -> StoredSStable.mergeMeta( ) // Beginning of merge
of metadata table,
    StoredSStable -> IO.beginSSDWrite( )    // Notifying that writing of
SSD begins for easier writing in a block unit
    for( i ... 1-4) // Opening a cursor for traversal of the SSTable to be
    merged
    cursor[i] = StoredSStable ->
IO.beginScanSSTable( victimStoreSSTable[i] )
    Loop: for( i ... 1-4) // Traversal of the SSTable to be merged
    metas += IO.readMeta( cursor[i] ) // Sequentially reading of the meta
from all the victim SSTables
    minMetaKey = StoreSSTable -> StoreSSTable.chooseMinKey(metas)
// Selecting the smallest meta from among the read meta key
    if( minMetaKey != null ) { // In case of a meta key to be newly
inserted, after inserting the meta key and starting loop again.
    StoredSStable -> IO.insertMeta( minMetaKey) // Recording a new
meta Key in the SSD
    goto Loop:
} // No minMetaKey is present, and there is no more meta key for
processing in the victim sstable.
    for( i ... 1-4)
    cursor[i].close( )
    newSStable = SSTableManager -> O.endSSDWrite( )    // Notifying
that writing of SSD ends.
    SSTableManager -> StoredSStable.regist( newSStable ) // In the SSD,
the SSTable only consisting of the meta key is present, and the SSTable,
though metaKey is newly written, each meta key indicates DataPage of all
the victim SSTables, and thus, is the effective SSTable. This SSTable is
registered.
    SStableManager -> StoredSStable.removeSStable( VictimStoreSStable )
// As new SSTable is accessible, removing victims is required.
```

The range compaction regarding the index data table may be realized as the following algorithm.

```
SStableManager -> StoredSStable.mergeMeta( ) // Performing
meta merge.
    StoredSStable -> IO.beginSSDWrite( ) // Notifying that writing
of the SSD begins for easier writing in a block unit.
    for( i ... 1-4) // Opening a cursor for traversal of the Sstable to be meta
merged.
    cursor[i] = StoredSStable ->
IO.beginScanSSTable( victimStoreSSTable[i], beginKey, endKey )
    // When opening a cursor for scanning, a reading scope is designated as
beginKey, endKey. If the scope is not designated, and all the areas of each
victim sstable is considered the corresponding scope, it is SStableMerge,
and when the scope is designated, it is RangeMerge.
    Loop:
    for( i ... 1-4) // Traversal of SSTable to be meta merged.
    datas += StoredSStable -> IO.readData( VictimStoreSStable[i] )
    // Sequentially reading data from all the victim sstables
    minDataKey = StoreSSTable -> StoreSSTable.chooseMinKey( datas)
// Selecting the smallest meta from among the read meta key
    if( minDataKey != null ) { // When there is a meta key to be newly
inserted, starting loop again.
    StoredSStable -> IO.insert( minDataKey) // Recording a new dataKey
in the SSD.
    goto Loop:
}
    // No minDataKey is present, and thus, there is no more data key to be
processed in the entire victim sstable.
    newSStable = SSTableManager -> O.endSSDWrite( ) // Notifying that
writing of ssd ends.
    SSTableManager -> StoredSStable.regist( newSSTable ) // Registering
completely new SSTable
    if( beginKey==NULL & endKey==NULL{      // When no scope is
set,
and all the areas are recorded newly
    for( i ... 1-4)
    SStableManager ->
    StoredSSTable.removeSStable( VictimStoreSStable ) //
As to these victims, newSSTable is accessible, and thus, the victims are
removed.
    } else {
    for( i ... 14)
    SStableManager -> StoredSStable.changeRoot( VictimStoreSStable,
beginKey, endKey ) // Recording the root again so that only beginkey <->
endKey area is excepted
}
```

The above-described method for generating a secondary index and the corresponding program may be stored in a non-transitory computer-readable recording medium. The non-transitory computer-readable recording medium indicates media which semi-permanently stores data and is readable with an apparatus, not a media which stores data for a short time such as a register, a cache, a memory, etc. Specifically, the above-described various applications or programs may be stored and provided in a non-transitory computer-readable recording medium such as a Compact Disk (CD), Digital Video Disc (DVD), hard disk, Blue-ray disk, Universal Serial Bus (USB), memory card, or Read Only Memory (ROM).

According to the various embodiments of the present invention, an I/O pattern which may maximize performance of a smart SSD may be used. That is, the read parallelism of the smart SSD may be maximized through the I/O pattern which recognizes a block, a channel, and the operation of the smart SSD. In addition, garbage collection overhead may be reduced, thereby minimizing writing amplification.

Secondly, through a configuration based on a Log Structured Merge (LSM) tree, a writing I/O pattern may be limited to sequential writing only, and thus, even in the ordinary SSD, performance can be maximized.

Thirdly, by merging the metadata tables of SSTables, I/O reading cost may be reduced. When inquiring of data, reading is performed for meta area (e.g. metadata table) and data area (e.g. index data table) for respective SSTables, and thus, I/O reads occurs for two times the size of the SSTables, respectively. When meta areas of several SSTables are merged first, I/O writing of the meta areas may be substantially reduced. In this case, the meta area is significantly smaller than the data area, and thus, overhead regarding merge of the meta area is very small.

Fourthly, merge overhead may be reduced through preferential merge regarding a scope or range. Each data has locality, and thus, priority differs by scope. Therefore, merge of only preferential scope may be performed rather than merge of an entire SSTable.

In this regard, the scope to be merged at one time decreases, and thus the merge operation requires less time, and the performance of the merge operation is increased.

Fifthly, efficiency of meta space can be increased via changing the structure of the meta area. The meta area of the former LSM tree indicates position of each key value as a key and offset format. By indicating this as sequential keys which are present in offset having a specific interval, the space which was used to indicate the former offset may be reduced.

The foregoing embodiments and advantages of the present invention are merely examples and are not to be construed as limiting thereof. The teaching of the present invention can be readily applied to other types of apparatuses. Also, the description of the embodiments of the present invention is intended to be illustrative, and are not intended to limit the scope of the present invention, and many alternatives, modifications, and variations of the present invention will be apparent to those skilled in the art and are included in the scope of the present invention as defined by the appended claims, and their equivalents.

What is claimed is:

1. A method of generating a secondary index comprising an index data table, the method comprising:
generating, in response to a size of an index data being greater than a size of a memory block, the index data table including the index data and recording the index data table in a memory;
generating a metadata table corresponding to the index data table and recording the metadata table in the memory; and
performing a merge and sort regarding at least one of the index data table and the metadata table,
wherein performing the merge and sort comprises performing, in response to an index data table for which the merge and sort is not performed being greater than or equal to a preset number, a merge and sort for metadata tables of the index data table for which the merge and sort is not performed without performing the merge and sort for the index data table for which the merge sort is not performed.

2. The method of claim 1, wherein performing merge and sort comprises performing range compaction for an index data table for which failure of reading occurs at least a preset number of times.

3. The method of claim 2, further comprising:
generating a metadata table of the index data table for which the range compaction is performed and recording the metadata table in the memory.

4. The method of claim 1, wherein the metadata table includes at least one of page information of the index data, a first key value of the index data table, and a root value indicating a range of a page of the index data.

5. The method of claim 1, wherein the index data table for which the merge sort is performed is recorded in at least one memory block.

6. The method of claim 5, wherein only one index data table is recorded in a memory block.

7. The method of claim 1, further comprising:
performing the merge and sort for at least one of the index data table and the metadata table for which the merge sort is not performed.

8. The method of claim 4, wherein the root value is recorded via atomic writing.

9. The method of claim 1, wherein the memory is a solid state drive (SSD).

10. An apparatus for storing a secondary index comprising an index data table, the apparatus comprising:
a memory; and
a controller configured to, in response to a size of index data being greater than a size of a memory block, generate the index data table including the index data and record the index data table in a memory, generate a metadata table corresponding to the index data table and record the metadata table in the memory, and perform a merge and sort regarding at least one of the index data table and the metadata table,
wherein the controller is further configured to perform, in response to an index data table for which the merge and sort is not performed being greater than or equal to a preset number, a merge and sort for metadata tables of the index data table for which the merge and sort is not performed without performing the merge and sort for the index data table for which the merge sort is not performed.

11. The apparatus of claim 10, wherein the controller is further configured to perform range merge and sort or range compaction for an index data table for which failure of reading occurs for at least a preset number of times.

12. The apparatus of claim 11, wherein the controller is further configured to generate a metadata table of the index data table for which the range compaction is performed and record the metadata table in the memory.

13. The apparatus of claim 10, wherein the metadata table includes at least one of page information of the index data, a first key value of the index data table and a root value indicating a range of a page of the index data.

14. The apparatus of claim 10, wherein the index table for which merge and sort is performed is recorded in at least one memory block.

15. The apparatus of claim 14, wherein only one index data table is recorded in a memory block.

16. The apparatus of claim 10, wherein the controller is further configured to perform merge and sort for at least one of the index data table and the metadata table for which merge and sort is not performed.

* * * * *